(12) United States Patent
Salter et al.

(10) Patent No.: US 11,904,761 B2
(45) Date of Patent: Feb. 20, 2024

(54) EXTERIOR LIGHTING SYSTEM FOR MOTOR VEHICLE

(71) Applicant: Ford Global Technologies, LLC, Dearborn, MI (US)

(72) Inventors: Stuart C. Salter, White Lake, MI (US); Hussein Berry, Dearborn, MI (US); Clayton Benjamin Ford, Dearborn, MI (US); Paul Kenneth Dellock, Northville, MI (US); David Brian Glickman, Southfield, MI (US); Dave Diamond, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 313 days.

(21) Appl. No.: 17/120,820

(22) Filed: Dec. 14, 2020

(65) Prior Publication Data
US 2022/0185170 A1 Jun. 16, 2022

(51) Int. Cl.
| | |
|---|---|
| *B60Q 1/24* | (2006.01) |
| *B60R 25/31* | (2013.01) |
| *B60R 25/10* | (2013.01) |
| *H05B 47/115* | (2020.01) |
| *B60R 25/30* | (2013.01) |
| *G06V 40/16* | (2022.01) |

(52) U.S. Cl.
CPC ............ *B60Q 1/247* (2022.05); *B60R 25/10* (2013.01); *B60R 25/305* (2013.01); *B60R 25/31* (2013.01); *G06V 40/172* (2022.01); *H05B 47/115* (2020.01)

(58) Field of Classification Search
CPC .. H05B 47/105–13; B60Q 1/24; B60Q 1/247; B60R 25/10; B60R 25/31; B60R 25/305; G06V 40/172; G06V 20/52; G06V 30/1431
See application file for complete search history.

(56) References Cited

U.S. PATENT DOCUMENTS

| | | | |
|---|---|---|---|
| 6,288,492 B1 * | 9/2001 | Wolfe | H05B 47/11 315/159 |
| 9,821,707 B2 | 11/2017 | Decaluwe et al. | |
| 9,975,473 B2 | 5/2018 | Wittorf | |
| 10,745,003 B2 * | 8/2020 | Kentley-Klay | B60W 30/0953 |
| 10,807,563 B1 | 10/2020 | Hwang et al. | |
| 11,109,471 B1 * | 8/2021 | Recker | H02J 13/00017 |

(Continued)

FOREIGN PATENT DOCUMENTS

| | | | | |
|---|---|---|---|---|
| CN | 107901824 B | * | 9/2020 | ............ B60Q 1/085 |
| KR | 20090065112 A | | 6/2009 | |

*Primary Examiner* — Abdullah A Riyami
*Assistant Examiner* — Syed M Kaiser
(74) *Attorney, Agent, or Firm* — Vichit Chea; Carlson, Gaskey & Olds, P.C.

(57) ABSTRACT

This disclosure relates to an exterior lighting system for a motor vehicle. An example system includes a plurality of lights configured to illuminate an area adjacent the motor vehicle, a plurality of sensors, and a controller configured to selectively activate and deactivate the lights based on signals from the sensors. The example system includes various aspects configured to preserve energy, including reducing the polling rate of sensors corresponding to deactivated lights, increasing light intensity in proportion to the speed of detected motion, and only illuminating those lights that correspond to locations of a recognized user.

15 Claims, 4 Drawing Sheets

(56) References Cited

U.S. PATENT DOCUMENTS

| | | | |
|---|---|---|---|
| 2009/0174573 A1* | 7/2009 | Smith | G08G 1/0962 340/905 |
| 2011/0087903 A1* | 4/2011 | MacDougall | G06F 1/26 713/323 |
| 2011/0227712 A1* | 9/2011 | Atteck | B60R 25/10 348/148 |
| 2017/0120902 A1* | 5/2017 | Kentley | B60R 19/42 |
| 2019/0174613 A1* | 6/2019 | Iga | H05B 47/105 |
| 2019/0283711 A1 | 9/2019 | Moran | |
| 2019/0299848 A1* | 10/2019 | Mori | B60Q 3/233 |
| 2021/0221280 A1* | 7/2021 | Zhao | B60Q 1/0023 |
| 2021/0247762 A1* | 8/2021 | Park | G06F 9/5083 |

\* cited by examiner

EXTERIOR LIGHTING SYSTEM FOR MOTOR VEHICLE

TECHNICAL FIELD

This disclosure relates to an exterior lighting system for a motor vehicle.

BACKGROUND

In addition to being relied upon for transportation, motor vehicles are increasingly being used as entertainment accessories for tailgating, camping, and other outdoor activities. Some vehicles include exterior lighting systems configured to illuminate an area adjacent the vehicle when the vehicle is parked. When activated, exterior lighting systems permit users to engage in outdoor activities adjacent the parked vehicle in low light conditions, such as at night.

SUMMARY

A system for a motor vehicle according to an exemplary aspect of the present disclosure includes, among other things, an exterior lighting system including a plurality of lights configured to illuminate an area adjacent the motor vehicle, a plurality of sensors configured to generate signals indicative of activity in the area at a polling rate, and a controller configured to selectively activate and deactivate the lights based on signals from the sensors. Further, the controller is further configured to reduce the polling rate of sensors corresponding to locations of deactivated lights.

In a further non-limiting embodiment of the foregoing system, the exterior lighting system includes a first set of lights configured to illuminate an area on a driver side of the motor vehicle, a second set of lights configured to illuminate an area on a passenger side of the motor vehicle, and a third set of lights configured to illuminate an area adjacent a rear of the vehicle.

In a further non-limiting embodiment of any of the foregoing systems, the first and second sets of lights each include an array of lights adjacent a roof rack.

In a further non-limiting embodiment of any of the foregoing systems, each array includes a plurality of lights and each light within the array is individually controllable by the controller.

In a further non-limiting embodiment of any of the foregoing systems, the first and second sets of lights also include at least one light adjacent a side view mirror.

In a further non-limiting embodiment of any of the foregoing systems, adjacent a respective one of the side view mirrors, each of the first and second sets of lights includes a first light configured to illuminate a first area below an adjacent door, and a second light configured to illuminate a second area further from the motor vehicle than the first area.

In a further non-limiting embodiment of any of the foregoing systems, each of the sensors is configured to detect motion in a respective sensing area, each of the lights is configured to illuminate a respective lighting area, and the controller is configured to correlate the sensing areas and lighting areas.

In a further non-limiting embodiment of any of the foregoing systems, the sensors are configured to generate signals indicative of whether a recognized user has entered the area, and the controller is configured to selectively activate a light in a region corresponding to the location of the recognized user.

In a further non-limiting embodiment of any of the foregoing systems, the sensors are configured to generate signals indicative of whether an unrecognized person has entered the area, and the controller is configured to deactivate a light in a region corresponding to the location of the unrecognized person.

In a further non-limiting embodiment of any of the foregoing systems, the controller is configured to issue an alert command in response to the unrecognized person entering the area.

In a further non-limiting embodiment of any of the foregoing systems, the controller is configured to selectively adjust an intensity of the lights in proportion to a speed of motion detected by the sensors.

In a further non-limiting embodiment of any of the foregoing systems, the sensors include one or more sensors of the following types: radio detection and ranging (radar) sensors, blind spot information system (BLIS) sensors, ultrasonic sensors, and cameras.

In a further non-limiting embodiment of any of the foregoing systems, at least one of the lights is located at least partially inside the motor vehicle.

A system for a motor vehicle corresponding to another exemplary aspect of the present disclosure includes, among other things, an exterior lighting system including a plurality of lights configured to illuminate an area adjacent the motor vehicle, a plurality of sensors configured to detect motion adjacent the motor vehicle, and a controller configured to selectively adjust an intensity of the lights in proportion to a speed of motion detected by the sensors.

In a further non-limiting embodiment of any of the foregoing systems, the controller is configured to selectively adjust the intensity of the lights such that the lights are brighter in locations corresponding to faster detected motion.

In a further non-limiting embodiment of any of the foregoing systems, the controller is configured to adjust the intensity of the lights in locations corresponding to no detected motion such that the lights are either deactivated or emit ambient light.

In a further non-limiting embodiment of any of the foregoing systems, the ambient light is about 20% of a maximum light intensity.

A system for a motor vehicle according to still another exemplary aspect of the present disclosure includes, among other things, an exterior lighting system including a plurality of lights configured to illuminate an area adjacent the motor vehicle, a plurality of sensors configured to generate signals indicative of whether a recognized user has entered the area, and a controller configured to selectively activate at least one of the plurality of lights in a region corresponding to the location of the recognized user.

In a further non-limiting embodiment of any of the foregoing systems, the user is recognized based on a detected presence of a keyfob of the motor vehicle, based on a detected presence of a mobile device of the user, or using facial recognition.

In a further non-limiting embodiment of any of the foregoing systems, the sensors are configured to generate signals indicative of whether an unrecognized person has entered the area, and, depending on a selected mode, the controller is configured to issue one or more of the following commands: (1) a command to deactivate lights in a region corresponding to a location of an unrecognized person, (2)

a command to flash at least some of the lights, and (3) a command issuing an alert to the user.

DETAILED DESCRIPTION

This disclosure relates to an exterior lighting system for a motor vehicle. An example system includes a plurality of lights configured to illuminate an area adjacent the motor vehicle, a plurality of sensors, and a controller configured to selectively activate and deactivate the lights based on signals from the sensors. The example system includes various aspects configured to preserve energy, including reducing the polling rate of sensors corresponding to deactivated lights, increasing light intensity in proportion to the speed of detected motion, and only illuminating those lights that correspond to locations of a recognized user. In addition to preserving energy, this disclosure provides for other benefits, which will be appreciated from the following description.

Figure 1:
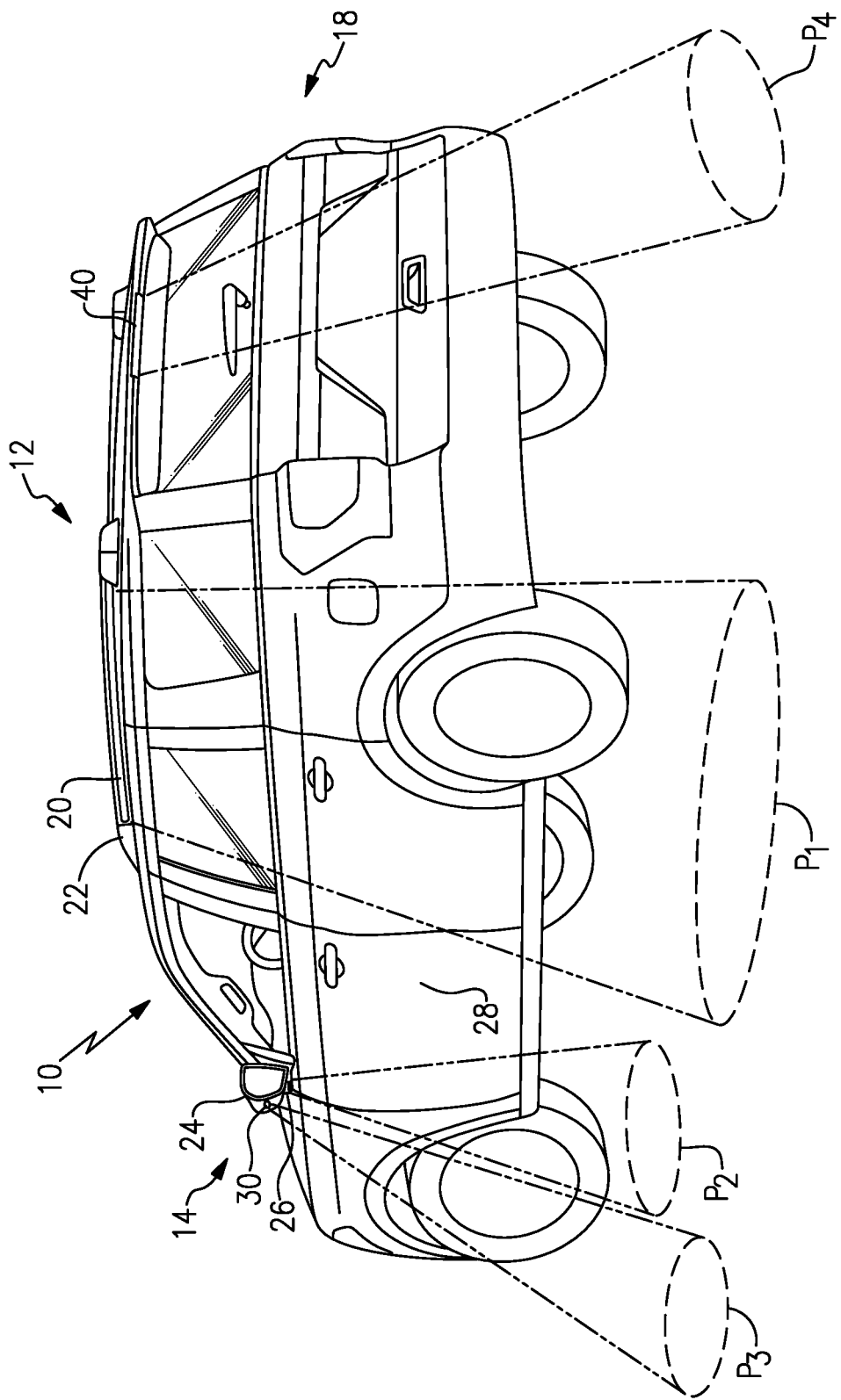
FIG. 1 is a rear perspective view of a side of an example motor vehicle including an example exterior lighting system.

FIG. 1 is a rear perspective of a side of a motor vehicle 10 ("vehicle 10"). In particular, FIG. 1 illustrates a side of the vehicle 10 side referred to as a driver side in regions such as the United States of America. The terms "driver side" and "passenger side" are used in this disclosure for convenience only. This disclosure extends to vehicles where the driver and passenger side are on opposite sides of what is shown in the figures. The vehicle 10 is a sport utility vehicle (SUV) in this example. It should be understood that this disclosure extends to other types of vehicles, such as sedans, cars, trucks, vans, etc.

The vehicle 10 includes an exterior lighting system 12. The exterior lighting system 12 includes a plurality of lights configured to illuminate an area A (FIG. 2) adjacent the vehicle 10. The exterior lighting system 12 is powered by a power source of the motor vehicle 10 and is configured to illuminate the area A when the vehicle 10 is parked. The area A is on an exterior of the vehicle 10, and includes the sides and rear of the vehicle 10.

While referred to as an exterior lighting system 12, the lights of the exterior lighting system 12 do not necessarily need to be located on an exterior of the vehicle 10. Rather, this disclosure extends to exterior lighting systems having lights mounted at least partially within a vehicle, as long as those lights are configured to illuminate a portion of the area A. Example interior lights configured to illuminate an exterior are those in a cargo area of an SUV or those attached to a rear liftgate of an SUV. When the liftgate is open, for example, those interior lights may be configured to illuminate the portions of the area A adjacent the rear of the vehicle 10.

Figure 2:
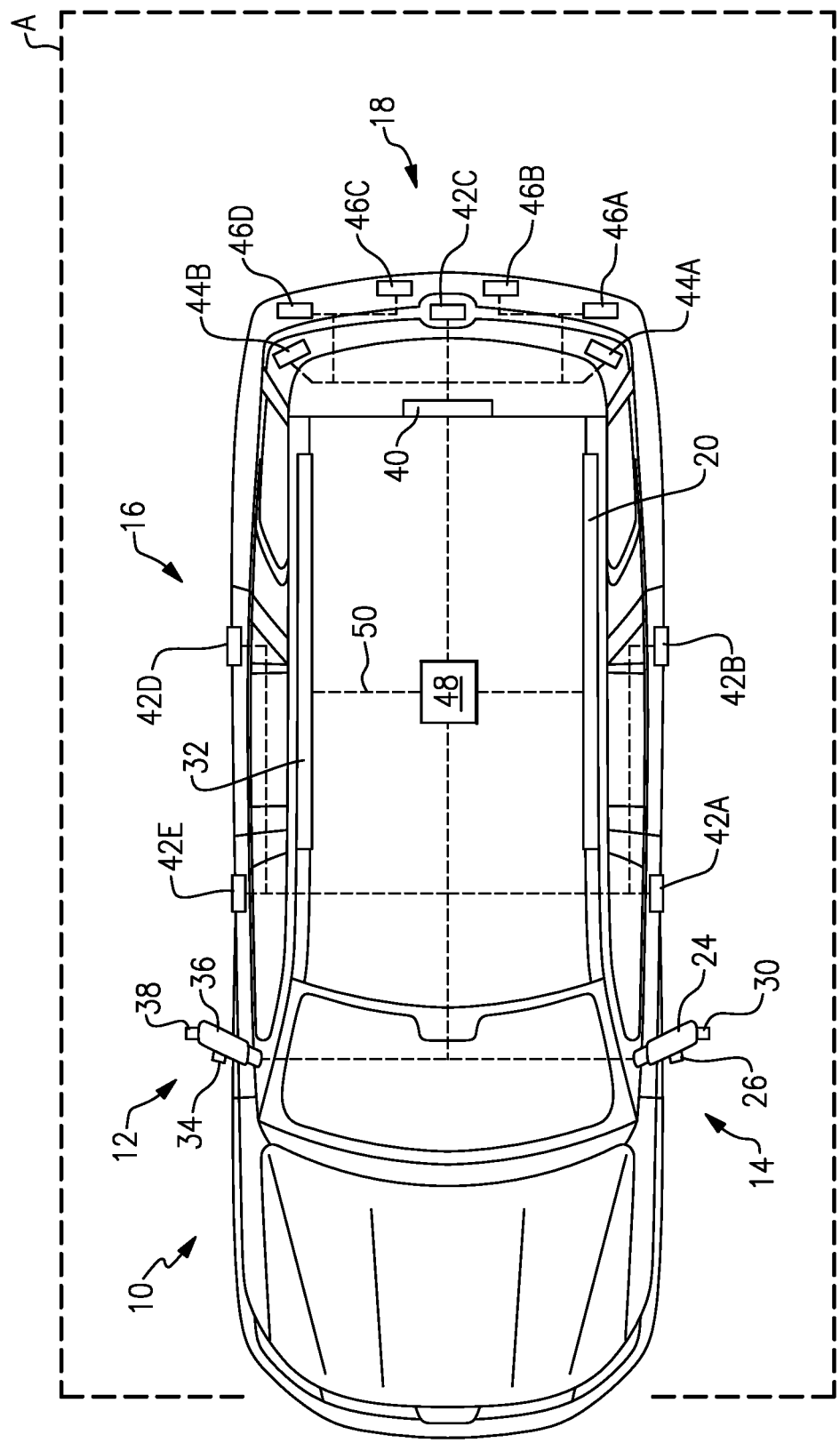
FIG. 2 is a top view of the motor vehicle of FIG. 1 and schematically illustrates various components of the motor vehicle, including lights, sensors, and a controller.

With joint reference to FIGS. 1 and 2, in an example, the exterior lighting system 12 includes a first set of lights 14 configured to illuminate a portion of the area A on the driver side of the vehicle 10, a second set of lights 16 configured to illuminate a portion of the area A on the passenger side of the vehicle 10, and a third set of lights 18 configured to illuminate a portion of the area A adjacent a rear of the vehicle 10. In an example, the area A extends a distance of about 20 feet to each side of the vehicle and about 15 feet behind the vehicle. The first, second, and third sets of lights 14, 16, 18 are configured to emit light of at least 5 lux.

The first set of lights 14 includes a first array of lights 20 arranged adjacent a roof rack 22 of the vehicle 10. The first array of lights 20 may include a plurality of spaced-apart lights, such as light emitting diodes (LEDs), mounted along a relatively flat, outer side of a rail of the roof rack 22. Each light within the first array of lights 20 is individually controllable. In an example, the first array of lights 20 includes fifty (50) LEDs each providing a half of a Watt for a total of 25 Watts.

While not required in all examples, the first set of lights 14, in this example, includes at least one light mounted adjacent a side view mirror 24 of the vehicle 10. In particular, the first set of lights 14 includes two lights on the side view mirror 24. A first light 26 is configured to illuminate a first area below an adjacent door 28, which here is the driver door. The first light 26 is sometimes referred to as a puddle light. A second light 30 is also mounted adjacent the side view mirror 24 in this example. The second light 30 is configured to illuminate an area further from the vehicle 10 than the first light 26. The second light 30 is sometimes referred to as a spotlight. The arrangement of the first set of lights 14 is exemplary. The first set of lights 14 could include a different arrangement of lights.

With reference to FIG. 1, the first array of lights 20 is configured to illuminate a portion $P_1$ of the area A, the first light 26 is configured to illuminate a portion $P_2$ of the area A, and the second light 30 is configured to illuminate a portion $P_3$ of the area A. The portion $P_2$ is closer to the vehicle 10 than the portions $P_1$ and $P_3$. The portions $P_1$, $P_2$, $P_3$ may overlap. The portions $P_1$-$P_3$ may vary depending on the optics used relative to the lights.

The second set of lights 16 is arranged substantially similar to the first set of lights 14, including a second array of lights 32 mounted to a roof rack, a first light 34 mounted to a side view mirror 36, and a second light 38 mounted to the side view mirror 36. The second set of lights 16 is configured to illuminate portions of the area A similar to $P_1$-$P_3$, except on the opposite side of the vehicle 10.

The third set of lights 18 includes, in this example, a first light 40 configured to illuminate a portion $P_4$ (FIG. 1) of the area A adjacent a rear of the vehicle 10. In this example, the first light 40 is a center high-mount stop lamp (CHMSL). The third set of lights 18 could include additional lights mounted adjacent the rear of the vehicle 10.

The vehicle 10 includes a plurality of sensors configured to generate signals indicative of activity adjacent the vehicle 10. In an example, the sensors are configured to detect motion adjacent the vehicle 10, specifically within the area A. An example arrangement of sensors is shown in FIG. 2. In the example of FIG. 2, the vehicle 10 includes a plurality of radio detection and ranging (radar) sensors 42A-42E, a plurality of blind spot information system (BLIS) sensors 44A, 44B, and a plurality of ultrasonic sensors 46A-46D. The radar sensors 42A-42E are each located on a respective door of the vehicle 10, in this example. The BLIS sensors 44A, 44B are located adjacent rear corners of the vehicle 10.

Further, the ultrasonic sensors 46A-46D are located adjacent a rear bumper of the vehicle 10. Each of the sensors 42A-42E, 44A, 44B, 46A-46D is configured to generate signals corresponding to detected motion, for example, within a respective sensing area. The sensing areas covered by the sensors 42A-42E, 44A, 44B, 46A-46D may overlap. A controller 48 is configured to correlate the sensing areas to locations that can be illuminated by the first, second, and third sets of lights 14, 16, 18.

While a particular sensor arrangement is shown in FIG. 2, this disclosure extends to other sensor arrangements, including other locations, quantities, and types of sensors. For instance, this disclosure extends to vehicles having one or more cameras configured to capture still or video images adjacent the vehicle 10. Such a camera could be part of an existing system of the vehicle 10, such as rear backup camera, a self-driving system (SDS) of the vehicle 10, a front camera, a 360° camera, etc. The camera could also be provided by a sensor of the SDS, such as a laser imaging, detection, and ranging (LIDAR) sensor.

While the sensors 42A-42E, 44A, 44B, 46A-46D have other uses, in this disclosure they are also useable when the vehicle 10 is parked, and in particular are configured to generate signals indicative of activity adjacent the vehicle 10, namely within the area A. The term indicative is used herein to refer to both "smart" sensors which can generate detailed signals and relay those signals to the controller 48 and also to signals which require some level of processing by the controller 48 in order for the controller 48 to discern relevant information from the signal.

The lights and sensors of the vehicle 10 are electrically coupled to the controller 48. The controller 48 is configured to selectively activate and deactivate each of the lights within the first, second, and third set of lights 14, 16, 18. Further, the controller 48 is configured to receive information from each of the sensors 42A-42E, 44A, 44B, 46A-46D, analyze that information, and to issue one or more commands based on that information. The controller 48 includes electronics, software, or both, to perform the necessary control functions for operating the vehicle 10 and executing various functions of the exterior lighting system 12. In one non-limiting embodiment, the controller 48 is a combination vehicle system controller and powertrain control module (VSC/PCM). Although it is shown as a single hardware device, the controller 48 may include multiple controllers in the form of multiple hardware devices, or multiple software controllers within one or more hardware devices. A controller area network (CAN) 50 allows the controller 48 to communicate with the various component of the exterior lighting system 12, namely the lights and sensors. Various connections of the CAN 50 are represented using lines in FIG. 2. Further, reference to the controller 48 performing an action in this disclosure includes the controller 48 issuing a command to a component which causes that action to occur.

In general, when the vehicle 10 is parked but exterior lighting is desired, the controller 48 is configured to selectively activate one or more of the lights such that the area A is at least partially illuminated. Further, to preserve energy, the controller 48 is configured to selectively activate and deactivate the lights based on the signals from the sensors 42A-42E, 44A, 44B, 46A-46D.

Figure 3:
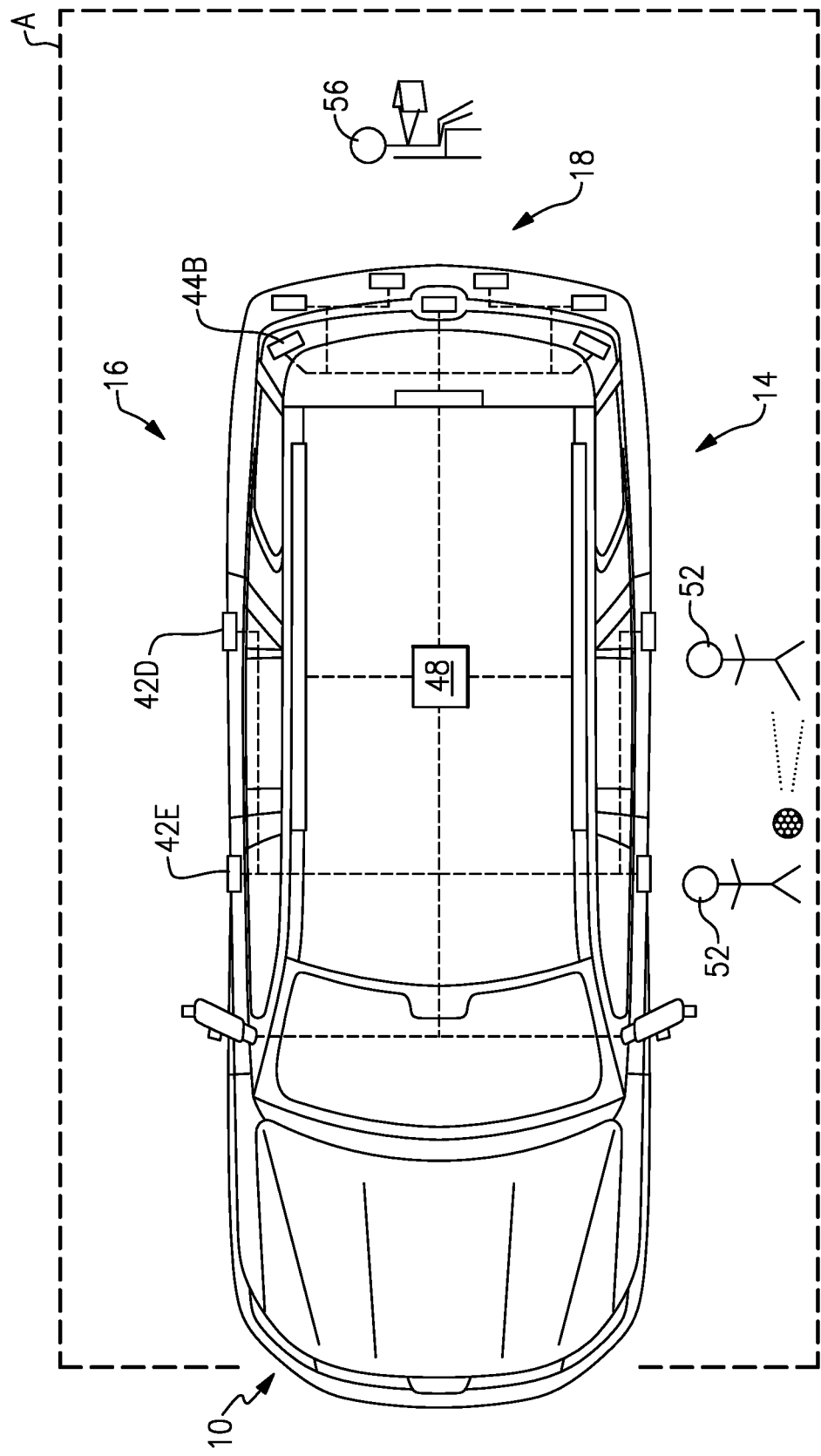
FIG. 3 is another top view of the motor vehicle of FIG. 1, and illustrates people engaging in various activities near the motor vehicle.

In one example, represented in FIG. 3, there are two people 52, 54 playing a game on the driver side of the vehicle 10 and another person 56 sitting in a chair adjacent the rear of the vehicle 10. The people 52, 54, 56 are within the area A. No people are present within the area A on the passenger side of the vehicle 10. In FIG. 3, the people 52, 54 are playing the game of soccer. This game is exemplary. The lights of the present disclosure enable users to engage in other activities and games within the area A such as ladder golf, corn hole, eating, playing cards, setting up a campsite, changing a tire, etc. In the example of FIG. 3, the controller 48 commands the first and third sets of lights 14, 18 to active (i.e., turn on) to provide lighting in the locations where the people 52, 54, 56 are present. The controller 48, in this example, does not activate the second set of lights 16 because no people are present within the area A on the passenger side of the vehicle 10.

An aspect of this disclosure relates to energy conservation by selectively reducing the polling rates of the sensors 42A-42E, 44A, 44B, 46A-46D. A polling rate of a sensor refers to how frequently the sensor takes a measurement. In this disclosure, in locations where lights are not activated, the controller 48 is configured to command the sensors associated with those locations to reduce their polling rate. With reference to FIG. 3, the controller 48 commands the sensors 42D, 42E, and, perhaps, 44B to reduce their polling rates as there is no detected activity on the passenger side of the vehicle 10. The sensors 42D, 42E, and 44B may have had a standard polling rate of four measurements per second. However, in an example, the controller 48 commands the sensors 42D, 42E, 44B to take one measurement every four seconds. If activity is again detected by one or more of the sensors 42D, 42E, 44B, the controller 48 may then command those sensors to resume their standard polling rate. These standard and reduced polling rates are exemplary.

Another aspect of this disclosure pertains to adjusting the intensity of the light emitted by the exterior lighting system 12. In particular, the controller 48 is configured to command each of the lights within the first, second, and third sets 14, 16, 18 to adjust their intensity, including brightness, in proportion to the speed of detected motion. Specifically, the controller 48 is configured to command the lights to increase their intensity with an increase in speed of motion. In the example of FIG. 3, the people 52, 54 are playing a relatively fast paced game of soccer within the area A on the driver side of the vehicle 10, whereas the person 56 is sitting in a chair reading a book and moving very little adjacent the rear of the vehicle 10. As such, the controller 48 commands the first set of lights 14 to emit light of a greater intensity than the third set of lights 18. In this way, energy is efficiently used as additional light is provided where it is needed, which is in locations corresponding to relatively faster motion. Light intensity may be controlled using pulse-width modulation (PWM) and may be controlled by percentage in increments of 10%, from 0% up to 100%, in an example.

Figure 4:
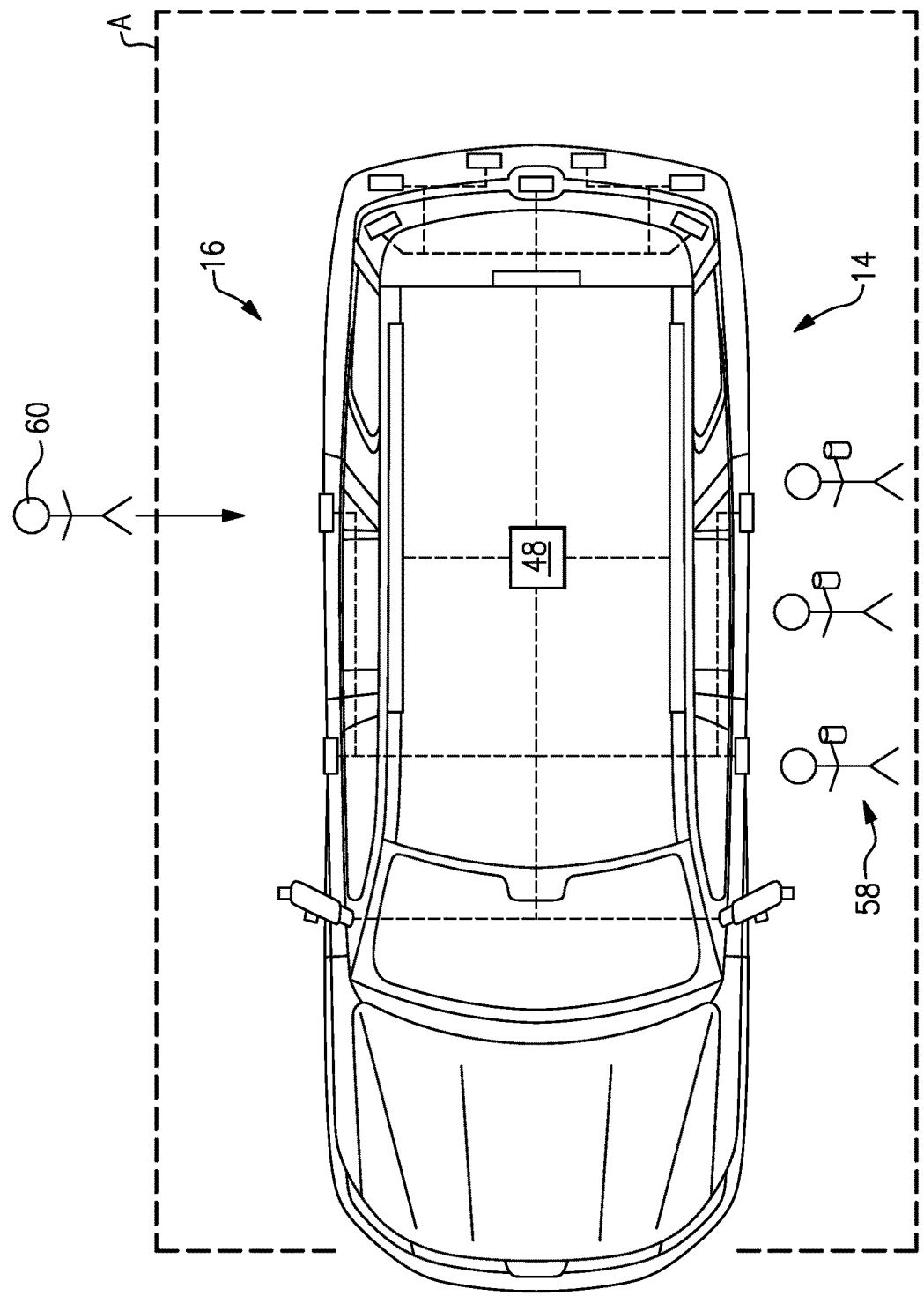
FIG. 4 is yet another top view of the motor vehicle of FIG. 1, and illustrates a group of people on one side of the motor vehicle and an unrecognized person approaching the motor vehicle from another side.

Still another aspect of this disclosure relates to the identification of people within the area A and various responses to recognized and unrecognized people entering the area A. In this disclosure, the controller 48 is configured to identify people using one or more known techniques. One technique includes facial recognition. For instance, the controller 48 may have access to one or more faces associated with authorized people, such as the owner of the vehicle 10 and their family. Another technique includes identifying a keyfob or phone as a key (PaaK) corresponding to a particular vehicle 10. In FIG. 4, a group of recognized users 58 are tailgating within the area A on a driver side of the vehicle 10 with the first set of lights 14 activated. The controller 48 is configured to activate lights corresponding to locations of recognized users. In a particular example, the controller 48 can track the location(s) of recognized users as they move within the area A and illuminate those locations to provide light where it is needed by the recognized users.

In FIG. 4, on an opposite side of the vehicle 10 as the group of recognized users 58, an unrecognized person 60 enters the area A. The controller 48 is configured to differentiate between humans and/or animals within the area A. The unrecognized person 60 is identified by the controller 48 based on the signals from the sensors and using one or more algorithms and/or other techniques. The vehicle 10 may include infrared LEDs to better assist with identifying people in low light conditions.

In a first example of this disclosure, when the unrecognized person 60 enters the area A, the controller 48 does not activate the second set of lights 16. Alternatively or in addition, the controller 48 is configured to push an alert to one of the recognized users 58 indicating an unrecognized person 60 has entered the area A, such as by sending an alert to a mobile phone of the owner of the vehicle 10. Alternatively or in addition, the controller 48 is configured to command some or all of the lights of the first, second, and third sets 14, 16, 18 to flash to alert the group of recognized users 58 that an unrecognized person 60 has entered the area A. In another example, the lights act as motion detector lights, and may be illuminated for a set period of time such as sixty seconds in the locations corresponding to the unrecognized person 60. If the unrecognized person 60 leaves the area A, the lights turn off. In some examples, a mode enabling alerts and/or flashing of lights may be disabled as too many unrecognized people may be identified in certain situations, such as in a parking lot after a concert or sporting event, as examples.

In any of the above examples, when no activity is detected in a particular location and/or an unrecognized person is within that location, the controller 48 may command the lights associated with those locations to either fully deactivate or to emit an ambient light level. The ambient light level may be 20% of the maximum light intensity, in an example. In this way, there is always some light within the area A, and energy is still conserved.

Further, various functions and settings of the lights may be set using an application on a mobile device of the user. In this regard, the controller 48 is in communication, either directly or indirectly, with the application and/or the mobile device of the user. In an example, a user may adjust various settings associated with control and/or function of the lights using an application known as FordPass™ or another similar application.

Directional terms such as "vertical," "upward," "downward," "forward," "rearward," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system for a motor vehicle, comprising:
    an exterior lighting system including a plurality of lights configured to illuminate an area adjacent the motor vehicle;
    a plurality of sensors configured to generate signals indicative of activity in the area at a polling rate; and
    a controller configured to selectively activate and deactivate the lights based on signals from the sensors, wherein the controller is further configured to reduce the polling rate of sensors corresponding to locations of deactivated lights.

2. The system as recited in claim 1, wherein the exterior lighting system includes a first set of lights configured to illuminate an area on a driver side of the motor vehicle, a second set of lights configured to illuminate an area on a passenger side of the motor vehicle, and a third set of lights configured to illuminate an area adjacent a rear of the vehicle.

3. The system as recited in claim 2, wherein the first and second sets of lights each include an array of lights adjacent a roof rack.

4. The system as recited in claim 3, wherein each array includes a plurality of lights and each light within the array is individually controllable by the controller.

5. The system as recited in claim 3, wherein the first and second sets of lights also include at least one light adjacent a side view mirror.

6. The system as recited in claim 5, wherein, adjacent a respective one of the side view mirrors, each of the first and second sets of lights includes a first light configured to illuminate a first area below an adjacent door, and a second light configured to illuminate a second area further from the motor vehicle than the first area.

7. The system as recited in claim 1, wherein:
    each of the sensors is configured to detect motion in a respective sensing area,
    each of the lights is configured to illuminate a respective lighting area, and
    the controller is configured to correlate the sensing areas and lighting areas.

8. The system as recited in claim 1, wherein:
    the sensors are configured to generate signals indicative of whether a recognized user has entered the area, and
    the controller is configured to selectively activate a light in a region corresponding to the location of the recognized user.

9. The system as recited in claim 8, wherein:
    the sensors are configured to generate signals indicative of whether an unrecognized person has entered the area, and
    the controller is configured to deactivate a light in a region corresponding to the location of the unrecognized person.

10. The system as recited in claim 9, wherein the controller is configured to issue an alert command in response to the unrecognized person entering the area.

11. The system as recited in claim 1, wherein the controller is configured to selectively adjust an intensity of the lights in proportion to a speed of motion detected by the sensors.

12. The system as recited in claim 1, wherein the sensors include one or more sensors of the following types: radio detection and ranging (radar) sensors, blind spot information system (BLIS) sensors, ultrasonic sensors, and cameras.

13. The system as recited in claim 1, wherein at least one of the lights is located at least partially inside the motor vehicle.

14. A system for a motor vehicle, comprising:
- an exterior lighting system including a plurality of lights configured to illuminate an area adjacent the motor vehicle;
- a plurality of sensors configured to generate signals indicative of whether a recognized user has entered the area; and
- a controller configured to selectively activate at least one of the plurality of lights in a region corresponding to the location of the recognized user,
- wherein the sensors are configured to generate signals indicative of whether an unrecognized person has entered the area, and
- wherein the controller is configured to issue a command to deactivate lights in a region corresponding to a location of the unrecognized person.

15. The system as recited in claim 14, wherein the user is recognized based on a detected presence of a keyfob of the motor vehicle, based on a detected presence of a mobile device of the user, or using facial recognition.

* * * * *